US009395454B2

United States Patent
Orava et al.

(10) Patent No.: US 9,395,454 B2
(45) Date of Patent: Jul. 19, 2016

(54) NEUTRON DETECTOR

(71) Applicant: FINPHYS OY, Helsinki (FI)

(72) Inventors: Risto Orava, Helsinki (FI); Tom Schulman, Porvoo (FI); Petteri Mehtala, Kellokoski (FI)

(73) Assignee: FINPHYS OY, Helsinki (FI)

( * ) Notice: Subject to any disclaimer, the term of this patent is extended or adjusted under 35 U.S.C. 154(b) by 0 days.

(21) Appl. No.: 14/063,545

(22) Filed: Oct. 25, 2013

(65) Prior Publication Data

US 2014/0077089 A1    Mar. 20, 2014

Related U.S. Application Data

(63) Continuation of application No. PCT/EP2012/053381, filed on Feb. 28, 2012.

(30) Foreign Application Priority Data

Apr. 27, 2011    (GB) .................................. 1107076.0

(51) Int. Cl.
*G01T 3/08* (2006.01)
*G01T 3/06* (2006.01)

(52) U.S. Cl.
CPC .... *G01T 3/06* (2013.01); *G01T 3/08* (2013.01)

(58) Field of Classification Search
CPC ....................................................... G01T 3/08
USPC .................................................. 250/370.05
See application file for complete search history.

(56) References Cited

U.S. PATENT DOCUMENTS 3,129,329 A * 4/1964 Love et al. ..................... 376/153
3,796,875 A * 3/1974 Michaelis ................. 250/390.04
(Continued)

FOREIGN PATENT DOCUMENTS

DE    10042076 A1    5/2001
EP    1 531 344 A1    5/2005
(Continued)

OTHER PUBLICATIONS

International Search Report, dated Jan. 2, 2013, from corresponding PCT application.
(Continued)

*Primary Examiner* — David Porta
*Assistant Examiner* — Meenakshi Sahu
(74) *Attorney, Agent, or Firm* — Young & Thompson (57) ABSTRACT

A device for detecting neutrons includes at least one common module, where a number of solid state sensors are assembled. The sensors are configured in the module side by side and/or stacked in a layered structure. At least one of the sensors includes neutron reactive material as a neutron converter for interacting with neutrons incident thereon to be detected and to release ionizing radiation reaction products responsive to interactions with the incident neutrons. The neutron converters are coupled with corresponding semiconductor elements so that the semiconductor elements interact with the ionizing radiation reaction products for providing electrical charges in proportion to the energy of the ionizing radiation reaction products. The semiconductor elements are configured with electrodes for providing charge collection areas for collecting the electrical charges and to provide electrically readable signals proportional to the collected electrical charges.

20 Claims, 7 Drawing Sheets

(56) References Cited

U.S. PATENT DOCUMENTS

| | | | |
|---|---|---|---|
| 5,083,028 A * | 1/1992 | Decossas et al. | 250/390.03 |
| 5,659,177 A | 8/1997 | Schulte et al. | |
| 6,349,124 B1 * | 2/2002 | Kronenberg et al. | 376/147 |
| 6,841,841 B1 * | 1/2005 | Blish et al. | 257/429 |
| 2006/0169905 A1 * | 8/2006 | Wenstrand | 250/370.1 |
| 2006/0255282 A1 | 11/2006 | Nikolic et al. | |
| 2006/0291606 A1 | 12/2006 | McGregro et al. | |
| 2010/0078570 A1 | 4/2010 | Frank | |
| 2010/0304204 A1 | 12/2010 | Routkevitch et al. | |
| 2011/0006195 A1 * | 1/2011 | Prendergast et al. | 250/252.1 |

FOREIGN PATENT DOCUMENTS

| | | |
|---|---|---|
| GB | 2474721 A | 4/2011 |
| WO | 9922251 A2 | 5/1999 |
| WO | 2007109535 A2 | 9/2007 |
| WO | 2009071587 A2 | 6/2009 |
| WO | 2010011859 A2 | 1/2010 |

OTHER PUBLICATIONS

GB Search Report, dated Jul. 7, 2011, from corresponding GB application.

\* cited by examiner

NEUTRON DETECTOR

TECHNICAL FIELD

The invention relates to a device for detecting neutrons, and in particular, but not exclusively, the invention relates to a device comprising sensors, the sensors having neutron reactive material for interacting with neutrons incident thereon.

BACKGROUND

Different kinds of sensors and detector structures are known for detecting neutrons. Neutrons as such cannot be detected directly but via interactions with neutron reactive materials producing radiation reaction products responsive to interactions with the interacting neutrons. The neutron reactive material converts the invisible radiation to detectable signals. If the radiation consists of charged particles, such as alphas, electrons or positrons, the electromagnetic interaction create charges which can be collected and detected.

All detectors use the fact that the radiation interacts with matter, mostly via ionization. One of the detectors used for detecting neutrons is a Helium-3 detector tube, where Helium-3 gas is used as a converter gas for capturing neutrons and "converting" captured neutrons into charged particles to be detected. The neutron is "converted" through the nuclear reaction $$n + {}^3He \rightarrow {}^3H + {}^1H + 0.764 \text{ MeV}$$

into charged particles tritium (T, $^3$H) and protium (p, $^1$H), which can be detected e.g. by creating a charge cloud in the stopping gas of a proportional counter or a Geiger-Müller tube, for example.

There is however some problems related to the known solutions. Even though Helium-3 gas has a high absorption cross section for thermal neutron beams and is widely used, it is very rare on Earth and thus the detectors based on the use of Helium-3 are quite expensive. In addition, since most of the neutron sources or reactions are accompanied by a gamma or X-ray background and because the neutral gamma or X-ray radiation interacts with semiconductor matter of the detectors, the gamma or X-ray background will disturb the accurate measuring, which is an undesired effect.

SUMMARY

A possible advantage of an embodiment the invention is to alleviate the drawbacks related to the known detectors. Especially an aim of an embodiment of the invention is to provide a sensor construction, which enables effective detection of the generated neutron reactive products and thus also provides an effective and non-expensive neutron detector. An additional goal of an embodiment of the invention is to provide a detector, which is in addition sensitive for detecting neutrons but at the same time "transparent" for the background gammas and/or X-rays. In addition an object of an embodiment of the invention is to provide a detector with fast charge collection and with excellent radiation hardness.

According to an embodiment a device and/or module for detecting neutrons comprises at least one common module, where a number of solid state sensors are assembled. The sensors are typically configured in the module side by side and/or stacked in a layered structure. At least one of the sensors comprises possibly advantageously neutron reactive material as a neutron converter for interacting with neutrons incident thereon to be detected and to release ionizing radiation reaction products responsive to interactions with said incident neutrons. Each of said neutron converters is coupled (or is at least in contact with) in the sensor with corresponding semiconductor elements, such as silicon or germanium based elements. Also other semiconducting material can be used, such as e.g. gallium arsenide (GaAs) or cadmium telluride (CdTe).

The semiconductor elements are configured to interact with said ionizing radiation reaction products and to provide electrical charges in proportion to the energy of the ionizing radiation reaction products. In addition the semiconductor elements are configured with electrodes to provide charge collection areas for collecting said generated electrical charges and to provide electrically readable signals proportional to said collected electrical charges. The sensors may be manufactured for example by using a semiconductor-on-insulator (SOI) wafer with which the neutron converter is introduced in manners described elsewhere in this document.

According to an embodiment at least one of the sensors used in the device and/or module is a reference sensor, which is configured to detect essentially only photons. This can be achieved by the reference sensor which either has no neutron conversion layer or comprises the layer made of the same material as the neutron conversion layer but of an isotope that does not capture neutrons. In addition at least one of the sensors used in the device and/or module may be a neutron sensitive and/or insensitive scintillating material sensor comprising neutron or gamma sensitive scintillator or scintillator crystal, such as KDP, ADP or CsI. These kind of sensors having scintillating material is used e.g. to increase the range of incident neutron energies to be detected and discrimination power of the sensor assembly. These can also be used with the reference sensors.

Since it is difficult to make a neutron sensor (especially Si based sensor) simultaneously efficient in neutron detection and insensitive to photons, such as gamma radiation, the reference sensor concept can be used to reduce e.g. the gamma sensitivity for example with the neutron efficient 3D structured sensors, where the gamma background detected by the reference sensor is subtracted from the counts detected by the neutron sensitive sensor. For optimal background subtraction the reference detector has to be identical to the neutron detector, i.e. its gamma response has to be identical to the gamma response of the neutron detector.

According to embodiments of the invention the solid state neutron sensor may be for example a planar sensor, where said neutron reactive material as a neutron converter is arranged essentially in two dimensionally plate. The semiconductor element may also be planar shaped and according to an embodiment the semiconductor element and the corresponding solid state neutron sensor are essentially parallel with each other.

The solid state sensors may also have 3D structures meaning for example that:
- at least one side of said the semiconductor element comprises complex, convoluted or rugged shape, such as sawtooth-like, and/or pores, such as pillars, channels, grooves, trenches (e.g. in the edge area of the semiconductor element), wells and/or other cavities, which are filled with the neutron reactive material,
- the semiconductor element comprises said neutron reactive material inside the structure of the semiconductor element,
- neutron reactive material is arranged at least partially between electrodes of the semiconductor element, and/or neutron reactive material is disposed in a portion nearest to charge collecting areas of the semiconductor element to interact with neutrons to be detected and release ionizing radiation reaction products.

The neutron reactive material and the semiconductor element may be arranged in many different ways to form a neutron sensitive sensor. For example the neutron reactive material may be configured on the surface of the semiconducting element, such as the SOI-wafer. According to an illustrative embodiment the neutron reactive material may locate substantially on the same side of the semiconductor element as the electrodes so that the ionizing radiation reaction products generate the electrical charges in the portion of the semiconductor element, where the portion is, possibly advantageously, in the proximity or around the charge collecting areas provided by the electrodes in or on said first semiconductor element. According to an embodiment the neutron reactive material may be arranged in the detector so that the incident neutrons to be detected interact with the neutron reactive material essentially in the portion nearest to said charge collecting areas provided by the electrodes in or on said first semiconductor element to which said neutron reactive material is connected or coupled with. Possibly, advantageously the neutron reactive material is arranged so that the surface area of the neutron converter is maximized. The embodiment offers a possible advantage, namely increased portion of the electrical charges (electron-hole pairs) generated by the reaction products in the first semiconductor can be caught by the electrodes.

The neutron reactive material may also be arranged so that the incident neutrons to be detected penetrate at least one portion of the semiconductor element first before reaching the neutron reactive material. This may have an a possible advantage that the thickness of the neutron reactive converting material is not so accurate, since the incident neutrons follow the exponential attenuation law when interacting with the converting material as is demonstrated elsewhere in this document. In addition the neutron reactive material may be arranged between the semiconductor element and read-out electronics electrically coupled with said semiconductor element, on the same surface of said semiconductor element as the electrodes, within said electrode structures and/or on the surface of said read-out electronics in order to still improve the probability for neutron capturing and detection.

According to an embodiment the semiconductor element and/or the converter of neutron reactive material may be configured to inhibit interaction with incident photons in order to minimize any disturbance caused by the photons to the accurate measuring of neutrons. This can be achieved for example by configuring the semiconductor element and/or the neutron converter to be physically sufficiently thin such that it is substantially transparent to said incident photons, such as gamma and/or x-ray photons. In addition the charge collecting area of the semiconductor may be arranged electrically so thin that essentially only the charges generated in the charge collecting area are collected and detected (and essentially not the incident photons, since most of them react deeper in the semiconducting material than in the charge collecting layer).

According to an illustrative embodiment said thickness of said semiconductor element is about 10 μm. According to a, possibly advantageous, embodiment of the invention the thickness of said semiconductor element is between 10-30 μm. According to an illustrative embodiment the thickness of the neutron sensitive converter is 10-30 μm at maximum.

The ultra thin detector may offer additional possible advantages over the known detectors, because when the thickness of the semiconducting layer is at the range of 10-30 μm, the incoming photons, such as background gammas or X-rays do not essentially interact with the semiconducting layer. For example, when the thickness of the semiconducting layer is about 10 μm, much less than 0.1% of background gammas will interact with it, which is clearly negligible. Thus a thin layer of e.g. silicon or equivalently a thin charge collection region within a silicon detector represents negligible conversion probability for incoming photons. For soft X-rays the conversion probability is highest, but still remains below fractions of a percent for an effective Si-detector thickness of 10 micrometers. In addition, when the detector is ultra thin the charge carriers produced can be effectively caught by charge collecting areas, such as electrodes.

The thinness of the semiconductor element can be achieved e.g. either by physically removing the semiconductor material (mechanically back thinning) or by appropriately doping the semiconductor so as to create only a thin active layer or i.e. electronically by arranging the electrodes to collect charges within a certain depth only (in the back side). The thinness of the neutron sensitive converter can be achieved by the manufacturing method, wherein the neutron reactive material is arranged on and/or inside the semiconductor element by applying a surface deposition method, such as laser ablation, atomic layer deposition (ALD), photolithography or sputtering technique. Especially 3D structures, such as V-shaped grooves, may advantageously be manufactured by ALD-method.

According to an exemplary embodiment the solid state sensors may be configured to form a module and/or device. An illustrative module and/or device comprises at least three elongated members, each of which comprises at least two solid state sensors, the sensors being configured in the module side by side, stacked in a layered structure or stacked together back-to-back. The elongated members with sensors may be arranged symmetrically in a longitudinal direction to form the module, which may then be inserted e.g. into the envelope structure encapsulating the sensors. The envelope structure may be in the form of a box, rectangular profile, or tube, for example.

According to an illustrative embodiment the device and/or module, such as a device in the envelope structure, like a tube, comprises also shielding material or layers of materials, such as layered foils of metals or laminate structures with layers of nanomaterials, optimised for:
  absorbing gammas and/or X-rays, whereupon the shielding material comprises preferably of high-Z value material, such as Lead (Pb), Osmium (Os) or Tungsten (W), and/or
  modulating incident neutrons whereupon the shielding material comprises for example polymers, paraffin, B10, Li6F, Gd157.

Possibly advantageously the shielding material is applied on the surface of the envelope structure, such as on the outer surface of a tubular structure. This is especially important when there exists strong field of low energy photons, such as gamma-rays. For example the strong activity of the 60 keV and lower energy gammas (from the Am-241/Be source, for example) is totally absorbed in the 10 mm thick lead shield. Approximately 62% of the Am-241/Be high energy gammas (4.438 MeV) pass through the lead shield and only 0.27% of these leave a signal in the Si-based sensors (mainly through Compton scattering). Since the Si-based sensors (especially in the form of the planar sensors) and the reference sensor are identical the shape of the gamma background spectra are also identical. The neutron signals can then be revealed by scaling and subtracting the reference detector spectrum from the neutron sensors spectrum.

According to an illustrative embodiment the module and/or device may comprise plurality of sensors stacked together back-to-back (as a sandwich structure) in longitudinal direction for example to maximize the surface detection area in a minimal volume. The stacked neutron sensitive sensors may have neutron conversion layer of moderate or low neutron capture efficiency (comprising e.g. BC, BN or similar; or made quite thin), whereupon the neutron flux can be detected by a number of sensors in the direction of the neutron flux. When the axis of the module comprising the sensors differs from the direction of the neutron flux, the flux is detected only by few of the sensors, whereupon the direction of the flux can be determined.

The neutron reactive material (called also as a neutron converter when deposited on/in the sensor) used in the sensors possibly advantageously comprises at least one of the following: $^{10}B$, $^{6}Li$, $^{155}Gd$, $^{157}Gd$, $^{113}Cd$, cadmium telluride (CdTe), cadmium zinc telluride (CdZnTe), natural Gadolinium oxide ($Gd_2O_3$), or composite materials based on boron nitride (BN) or lithium fluoride (LiF). For example the natural Cd containing also $^{113}Cd$ which has a high cross section for thermal neutron capture is well suitable for converting captured neutrons to gamma photons and conversion electrons. When a neutron is captured for example by a Cd nucleus, a 558 keV photon is emitted and about 3% of photons are converted to electrons of the same energy by the internal conversion mechanism.

The embodiments, where the neutron reactive material is applied in different places, such as in 3D structured, and/or having complex, convoluted or rugged shapes, maximize the surface area of the neutron reactive material so that more neutrons will interact with the neutron reactive material. This may offer possible advantages, such as increases the efficiency for converting incident neutrons to reaction products. In addition neutrons may also interact with the neutron reactive material near the read-out electronics, the semiconductor element and especially the charge collecting areas (electrodes) which makes the detector very effective for detecting neutrons. In addition the distances for the generated reaction products from the origin to the semiconductor and electrodes can be effectively minimized which further improve the effectiveness of the sensors.

According to an embodiment of the invention the detector may also comprise in addition a second semiconductor element, which is typically much thicker than the first semiconductor element coupled with the neutron reactive material. According to an example the second semiconductor element is several hundred times thicker than the first one, possibly advantageously several millimeters, and according to an example of the order of 5 mm. The second semiconductor element is, possibly advantageously, so thick that it is sensitive for the gamma photons e.g. generated by the neutrons when interacting with the neutron reactive material. In addition the second semiconductor element is adapted to provide electrical charges (electron-hole pairs) proportional to the energy of said gamma photons. According to an embodiment the second semiconductor element may be used e.g. to determine the kinematic of the detected neutrons, such as e.g. a path of the gamma photon generated by the neutron in the neutron reactive material or reaction place of the neutron in the neutron reactive material, as well as also energy of the incident neutron. Thus, when the kinematic (momentum or energy and direction) of the gamma photon and the energy of the reaction product is determined, the source or origin of said incident neutron can be identified. In addition the thick layer has a possible advantage in the module structure since it may efficiently absorb incident photons and thereby reducing the photons entering to another detector in the module.

According to an embodiment the device comprises an additional coincidence means configured to trigger e.g. the coincident detection of photons (such as gammas/X-rays) via the other sensors (e.g. reference sensors) than the neutron sensitive sensors for optimum background rejection. For example the gammas detected coincidentally by these other sensors can be used to reduce e.g. gamma background detected also by the neutron sensitive sensors.

In addition the coincidence means may be used for providing a time window during which the gamma photons are detected by the second semiconductor element. The starting point of the time window may be triggered by the interaction of the neutron with the neutron reactive material generating said gamma photon, or practically by the electrical signal generated by the electrodes of the first semiconductor element due to detecting generated electron-hole pair as discussed elsewhere in this document. This ensures that the e.g. undesired background gamma or X-ray photons detected for example by the reference sensors or by the second semiconducting element (e.g. gamma background) can be excluded or rejected. Also, according to an embodiment, energy discrimination can be applied to exclude undesired background gamma or X-ray photons the energy of which clearly differs from that of the gamma photons generated by the detected neutrons in the neutron converting material.

It should be noted that the semiconductor elements may be electrically divided into plurality of areas (pixels) or, whereupon the accurate or at least rough location of the neutrons (or gamma/X-ray photons in reference sensors) hit the detector or at least the reaction products generated by the neutrons can be determined. The dividing can be achieved e.g. by plurality of electrodes applied in and/or on the semiconducting material so that the electrical charges generated in the semiconductor element is adapted to be collected by the nearest electrode. Thus the location of the generated electrical charge is determined based on the location of the electrode collecting said electrical charge.

The read-out electronics may be implemented e.g. by a programmed circuits, such as FPGA, ASIC or similar chip or microprocessors, which may be flip-chip bonded with the electrodes of the semiconductor element e.g. via bump bond elements. The read-out electronics are possibly advantageously adapted to detect the charges collected by the electrodes and generate electric signals proportional to the collected charges either sensitive for the location or not. According to an embodiment the read-out electronics may be implemented only for detecting counts (whereupon the electrodes may be short-circuited, because the location information is not needed), but according to another embodiment also for determining dose or even for providing information for neutron imaging, especially when the location information is also provided. In addition the electronics may be used for subtracting the background gamma or X-rays photons detected by the reference sensors from the signals detected by the neutron sensitive sensors. Still in addition for the read-out system a specific algorithmic pattern recognition software can used for discrimination of unwanted signals.

The device and/or module comprises cooling means for cooling the sensors, such as a cold finger arrangement, a heat conductive strip of metal connected to an outside heat sink, or an active cooling element, such as Peltier element or a small mechanical fan inserted e.g. within the end structure of the outside shielding envelope.

BRIEF DESCRIPTION OF THE DRAWINGS

Next embodiments of the invention will be described, by way of non-limiting example only in greater detail with reference to the accompanying drawings, in which.

DETAILED DESCRIPTION

Figure 1A:
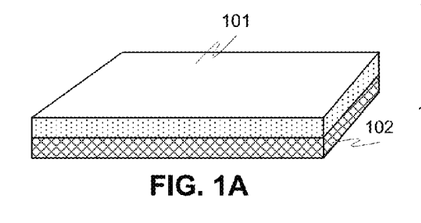
FIG. 1A illustrates an example of physically thin planar semiconductor detector of neutrons with a neutron converter deposited on the surface according to a, possibly advantageous, embodiment of the invention.
Figure 5:
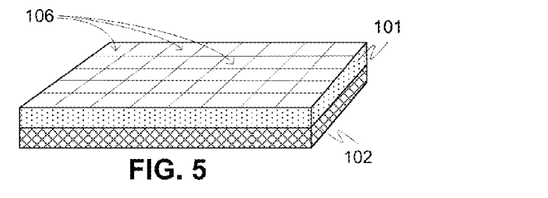
FIG. 5 illustrates a pixelization of the detector in order to detect both the neutron collision and its location on the detector according to a, possibly advantageous, embodiment of the invention.

The semiconductor neutron sensors can be divided into groups determined by how the converter, i.e. the neutron reactive material, is implemented in the detector:

1° The first type is a planar neutron semiconductor sensor, such as is depicted in FIGS. 1A, and 5, for example. It may be e.g. a simple planar diode where the PN junction is parallel to the detector surface. The neutron converter may be deposited for example on the semiconductor surface, such as on the SOI surface.

2° The second type are so called 3D sensors, such as is depicted in FIGS. 1C, 2, 8, 10-13. The abbreviation "3D" stands for 3D structures created inside, but also on the surface of the sensor, where the shape, such as surface of the neutron converter is complex, convoluted or rugged shape, such as sawtooth-like, and/or pores, such as pillars, channels, grooves, trenches (e.g. in the edge area of the semiconductor element), wells and/or other cavities, which are filled with the neutron reactive material. The 3D structures increase the surface area between the neutron converter and the detector material and thereby also the surface area of the neutron converter as well as the probability that incident neutrons will be converted and detected. Such geometries allow a larger volume and/or surface area of the neutron converter while keeping a high probability of the secondary particle detection. It should be noted that at least part of the 3D-structures (such as pores or pillars inside the semiconducting material) may also be dedicated for electrodes, which increases the probability that charges (such as electron-hole pairs) created in the semiconducting element will be detected.

Figure 1B:
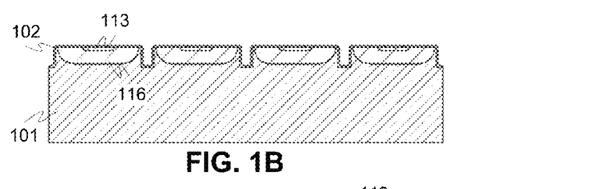
FIGS. 1B-C illustrate examples of a thin semiconductor neutron detector with a neutron converter deposited on the surface according to a, possibly advantageous embodiment of the invention.
Figures 1C, 3:
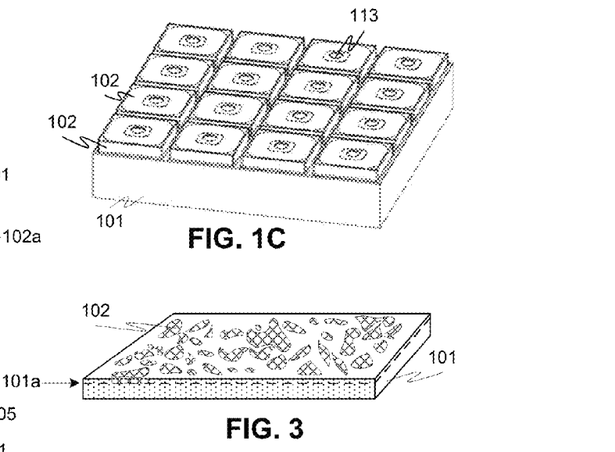
FIG. 3 illustrates a detector with neutron reactive material on its surface according to a, possibly advantageous, embodiment of the invention.

FIG. 1A illustrates an example of physically thin planar semiconductor detector of neutrons with a neutron converter 102 deposited on the surface of a semiconducting element 101. FIGS. 1B-C illustrate examples (side and perspective views) of a thin semiconductor neutron detector with a neutron converter 102 deposited on the surface of the semiconducting element 101 according to a, possibly advantageous, embodiment of the invention. Also the electrodes 113 and depletion areas 116 can be seen in FIGS. 1B-C, as well as the 3D structure, which increases the surface area of the neutron converter 102 made of neutron reactive material. According to an embodiment the pixel size may be 100-300 μm. The structure may be e.g. bump-bonded for position sensitive detection, but also short-circuited if the purpose of using is e.g. only count detection. Grooves can be manufactured e.g. by dicing or etching. It should be noted that the similar structure may also be applied in other detectors depicted in this document in connection with other figures.

Figures 2, 4:
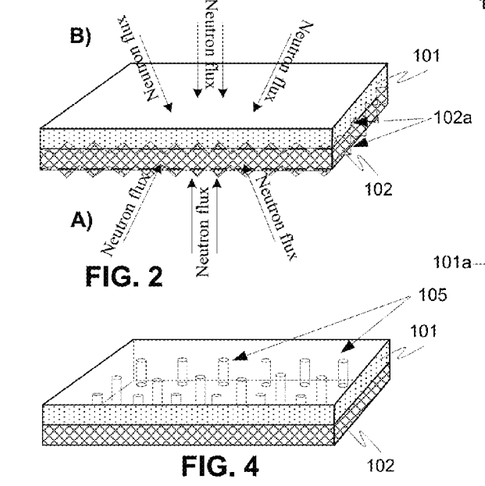
FIG. 2 illustrates a semiconductor detector, where the converter has more complex or rugged shape both in outer surface and the surface coupled with the detector sensitive volume according to a, possibly advantageous, embodiment of the invention.
FIG. 4 illustrates a semiconductor detector with pores according to a, possibly advantageous, embodiment of the invention.

FIG. 2 illustrates a semiconductor detector, where the converter 102 has more complex or rugged shape 102a both in outer surface and the surface coupled with the semiconductor detector sensitive volume. This kind of converter may efficiently convert neutrons even though they do not enter into the detector (converter material) perpendicularly. Again it should be noted that the neutrons to be detected may be arranged to incident either from the front (first through the converter material 102, direction A) in FIG. 2) or back side (first through the semiconducting material 101, direction B) in FIG. 2) of the detector.

FIG. 3 illustrates a detector, where the neutron reactive material 102 is applied, such as ion-implanted on the surface and/or inside the structure of the semiconductor element 101, possibly advantageously in the proximity to the charge collecting areas so that the release ionizing radiation reaction products can effectively reach the semiconductor and that the generated electron-hole pairs can be effectively caught by said charge collecting areas. When the neutron reactive material 102 is applied inside the structure, it is still, possibly advantageously, arranged in the surface layer 101a in the proximity to the charge collecting areas (not shown in FIG. 3) so that the released ionizing radiation reaction products can effectively reach the semiconductor 101 and that the generated electron-hole pairs can be effectively caught by said charge collecting areas. The neutron reactive material 102 may be arranged as clusters on and/or in the surface of the first semiconductor element 101 (as in FIG. 3), but also on the surface of the read-out electronics, or also between the read-out electronics and the semiconductor element, and/or on the surface of the first semiconductor element. This can be achieved for example by the laser ablation.

FIG. 4 illustrates a semiconductor detector with pores 105, such as pillars or other cavities, which may be filled with the neutron reactive material 102. The cavities may be in perpendicularly in relation to the converter layer coupled with the detector material, but also in some other angle so that the neutrons will interact with the filling material even though they will enter into the detector in other angle than essentially perpendicular. The detector structure having pores or other cavities may also in additionally have more complex shapes for the surfaces as well as comprise also neutron reactive material as clusters on and/or inside the detector structure.

The pores may be manufactured by the known technologies applicable for fabrication of 3D structures (pores) in semiconductor materials. The technologies of pore fabrication are for example reactive ion etching and electrochemical etching. In both cases, the etching may be preceded by a photolithographic step which prepares a mask for the etching. The mask protects areas of surface against the etching and opens top of patterns to be etched. Type of the mask depends on the used technology. It can be a metal for DRIE or $SiO_2$ layer for the electrochemical etching.

In Deep Reactive Ion Etching (DRIE) is a highly anisotropic etch process used in microsystem technology. It is used to create deep and high aspect ratio holes and trenches in silicon and other materials. Structures with aspect ratios 20:1 and more can be produced. DRIE etch rates are 5-10 μm/minute.

Another illustrative method for pore creation is the electrochemical etching (EE), which is a low cost alternative to deep reactive ion etching (DRIE). It allows fabrication of structures such as walls, tubes, pillars and pores. In electrochemical etching the applied electric field may be concentrated e.g. on the inverted pyramid tips (for example when the shape is like sawtooth).

FIG. 5 illustrates a possible pixelization 106 of the detector in order to detect both the neutron collision (or gamma/X-ray photons in reference sensors) and its location on the detector. The pixelization may be implemented e.g. by dividing at least the portion of the semiconducting element 101 electrically into plurality of areas, hereinafter pixels 106. The electrical dividing can be achieved e.g. by using plurality of electrodes, whereupon the electrical charges generated in the semiconductor element are collected by the nearest electrode. Thus also the location of the generated electrical charge in the semiconducting element 102 can be determined based on the location of the electrode collecting said electrical charge.

Figure 6:
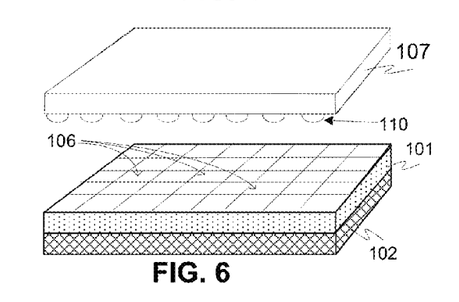
FIG. 6 illustrates a semiconductor detector with a readout chip according to a, possibly advantageous, embodiment of the invention.

However, in order to read the collisions and location the detector of FIG. 5 is, possibly advantageously, provided in addition with a read-out chip 107, as is illustrated in FIG. 6. The detector may be for example flip-chipped or bump-bonded to the readout chip 107, such as e.g. CMOS (Complementary Metal-Oxide-Semiconductor) or the like. The bump-bonding may be implemented via bump-balls 110.

Figure 7:
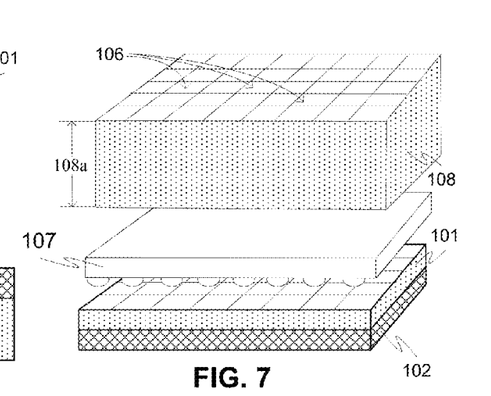
FIG. 7 illustrates a semiconductor detector with an additional second semiconducting element according to a, possibly advantageous, embodiment of the invention.

FIG. 7 illustrates a semiconductor detector with an additional second semiconducting element 108. The detector of FIG. 7 comprises neutron converter 102 and ultra thin semiconducting element 101 similarly as discussed earlier in this document, but in additionally the detector comprises also second additional semiconducting element 108. The second semiconducting element 108 is typically much thicker (108a) that the one 101 coupled with the neutron converter material 102, It 108 may comprise cadmium telluride (CdTe) or cadmium zinc telluride (CdZnTe), for example. The typical or example thickness of the thicker second semiconducting element 108 may be even 5 mm or more.

In some neutron conversion reactions gamma rays or X-rays are created. These gammas should not be detected by the first semiconducting element 101 but should escape or penetrate the first semiconducting element 101 and be detected by a separate detector, such as the second semiconducting element 108.

A possible advantage of the neutron detector according to FIG. 7 is that for example the gamma rays or X-rays (originated from the collision of neutron to be detected with the neutron reactive material) passing the ultra thin semiconducting element 102 may be detected by the thicker second semi-conducting element 108, because the probability for the interaction of the gamma rays or other reaction products with the semiconducting material increases when the thickness of the semiconducting material increases. Thus the kinematic of the detected neutrons, such as e.g. a path of the gamma photons generated by the neutron in the neutron reactive material or reaction place of the neutron in the neutron reactive material, as well as also energy of the incident neutron can be detected. When the kinematic (momentum or energy and direction) of the gamma photon and the energy of the reaction product is determined, the source or origin of said incident neutron can be identified (as can be seen e.g. in FIG. 14B, where as an example X-ray photon interacts with the second semiconducting material producing measurable charge).

Figure 14A:
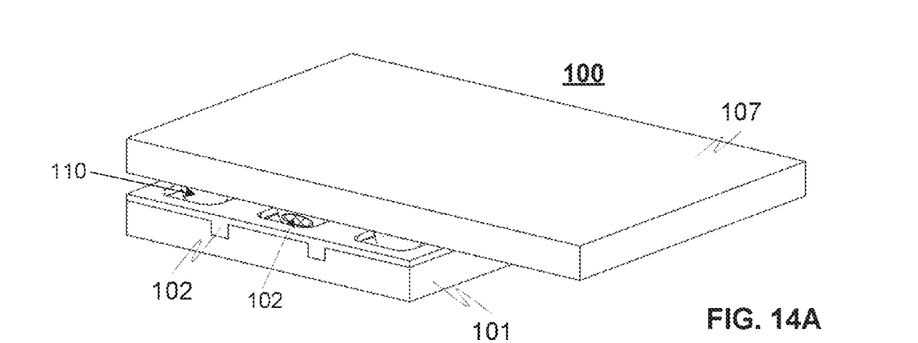
FIGS. 14A-C illustrate neutron detectors according to, possibly advantageous, embodiments of the invention.
Figure 14B:
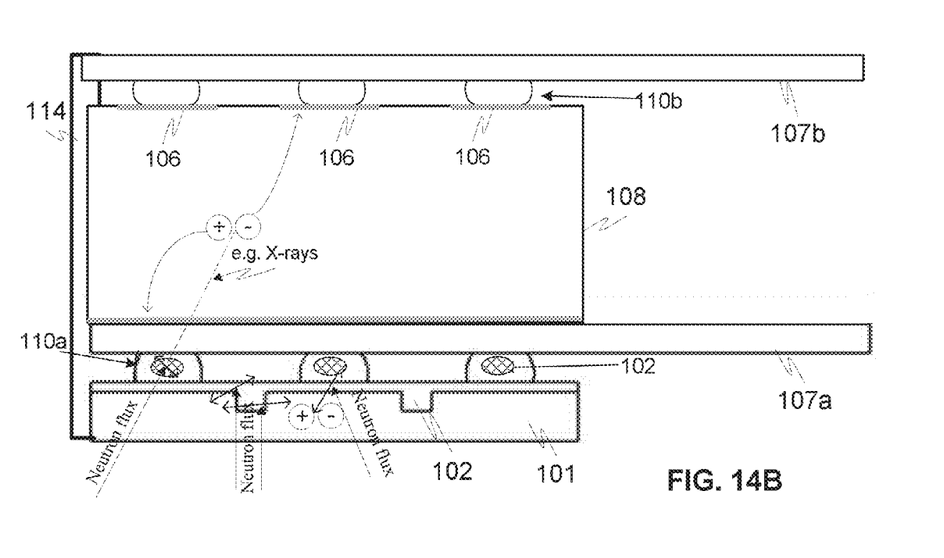
Figure 14C:
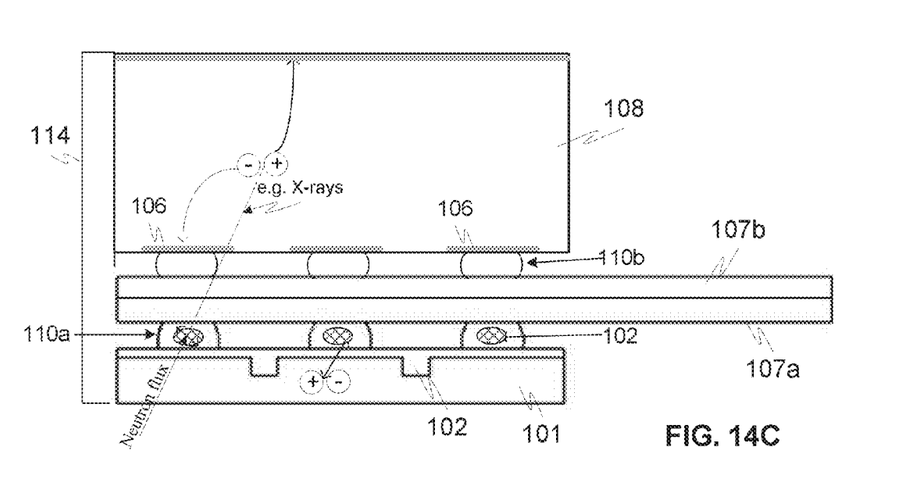

The second semiconducting element 108 also, possibly advantageously, comprises own pixelization 106, and it should be provided by own readout chip (such as shown in FIGS. 14B-C), which may be arranged in electrical connection with the pixelization 106 of the second semiconducting element.

Figure 8:
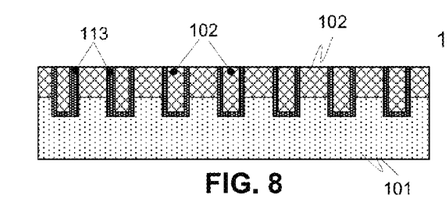
FIG. 8 illustrates a neutron detector with electrodes comprising neutron reactive material according to a, possibly advantageous, embodiment of the invention.

FIG. 8 illustrates a neutron detector with electrodes 113, where the electrodes may be e.g. etched into the detector structure for example in the form of cylinder. According to an embodiment the electrodes 113 may comprise neutron reactive material 102 inside the electrode structure 113. In other words the outer layer of the electrode structure 113 forms an electrode and the inner portion is filled with the neutron reactive material 102. This still increases the surface area of the neutron reactive material and thereby also the probability that the incident neutrons will be converted into the reaction products. In addition when the reaction products fly through the electrode wall, they will, possibly advantageously, produce electrical charges (such as electron-hole pairs) in the vicinity of the electrode, whereupon the produced charges can be effectively caught by the electrode. Thus the detector illustrated in FIG. 8, but similarly also in FIGS. 10-13, is very efficient both for converting the neutrons and collecting the charges.

FIGS. 9A-D illustrate an example of an electrically thin structure for semiconductor detector of neutrons with a neutron converter deposited on the surface, where the semiconducting element 101 is electrically thin (101a most advantageously 10-30 μm), and which still enables the charges to be produced by the reaction products in the semiconductor to reach the electrodes 112. The detector of FIGS. 9A-D comprises a neutron converter 102, possibly advantageously, deposited on the "back" surface of the semiconductor 101, so the same side of the semiconductor 101 than where the electrodes 112 are applied and the same side where the read-out chip will be placed (when it is used).

The detectors of FIGS. 9A-D can be manufactured e.g. so that the SOI wafer 113 has an optional neutron converter layer 102*a* to increase the probability of neutron conversion. An applied voltage between the n+ (or p+) 3D pixel electrodes 112 and the p (or n) type silicon 101 creates a depletion layer extending down to the conversion layer 102*a* and sideways to the regions between the 3D electrodes 112. Grooves 111 increase the surface area of the neutron conversion layer 102*b* for higher neutron absorption probability. The dimensions of the grooves 111 and pixel plateaus are preferably chosen so as to produce the largest possible surface area of the conversion layer 102*b* for a desired thickness of the active region 101. The thickness of the neutron conversion layers 102*a* and 102*b* is typically 5 µm. The thickness of the active region, i.e. the semiconducting element 101 is typically 10-30 µm. The wafer substrate 113 can be of conventional thickness (as in the drawing) or physically thinned, as described elsewhere in this document.

The wafer substrate 113 can alternatively be a high resistivity Si wafer without the conversion layer 102*a*. If a high resistivity Si wafer is used the thickness of the active region of the first semiconducting element can be made small by tuning the depletion voltage appropriately or by doping a p well (n well if the substrate is p type) around the electrodes 112. The 3D electrodes 112 can alternatively be planar processed 2D electrodes, such as depicted in connection with FIGS. 1B-C.

Figure 9A:
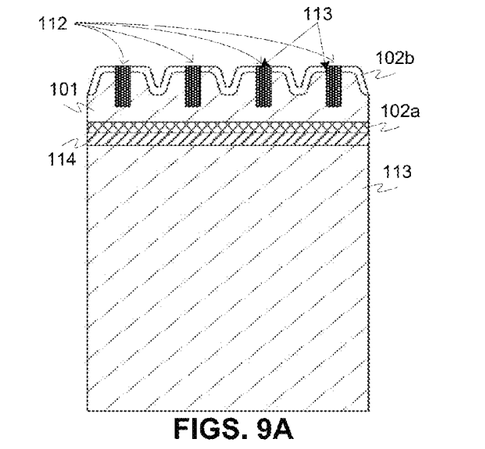
FIGS. 9A-D illustrate an example of an electrically thin structure for semiconductor detector of neutrons with a neutron converter deposited on the surface according to a, possibly advantageous, embodiment of the invention.
Figure 9B:
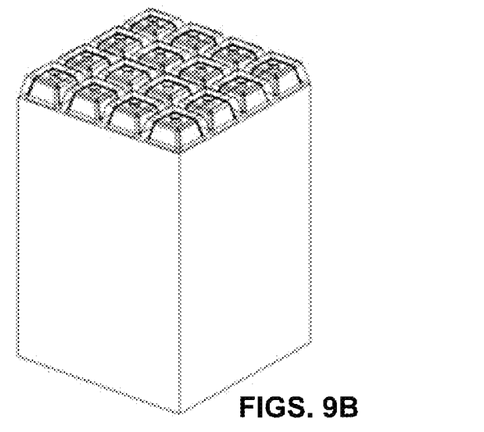
Figure 9C:
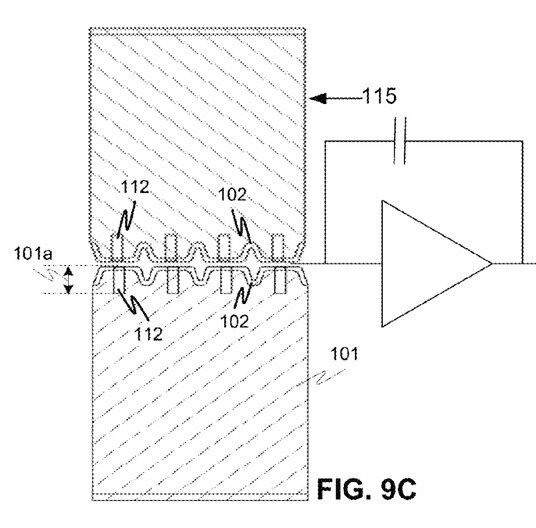
Figure 9D:
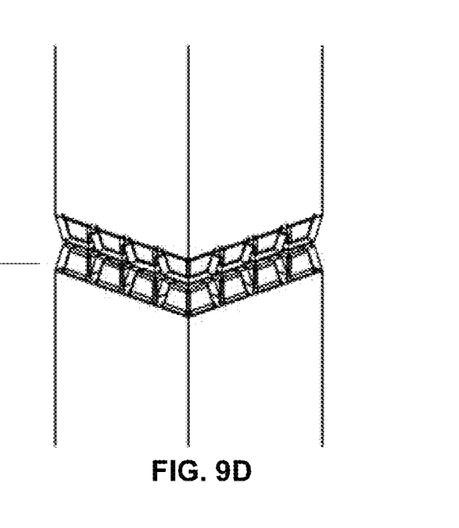

According to an embodiment the pixel electrodes can either be shorted together (e.g. by a sputtered metal layer on top of the pixel electrodes) for single channel readout as is depicted in FIG. 9C or connected to a multi channel readout circuit with bump or wire bonding or similar means as 5 illustrated e.g. in connection with FIG. 6. If the pixels are shorted and the detector is used as a single channel device two detectors can be sandwiched face-to-face for double efficiency, as illustrated in FIGS. 9C and 9D.

It should be noted that the detector may comprise an additional detector element 115 (essentially similar than the lower one), where the detector elements are arranged face-to-face to each other and, possibly advantageously, so that the neutron converters 102 of the detector elements are faced to each other. Now the read-out means, such as read-out electronics or even conductive wires, can be applied between the detector elements. The embodiment having two detector elements further enhances neutron conversion efficiency.

Figure 10A:
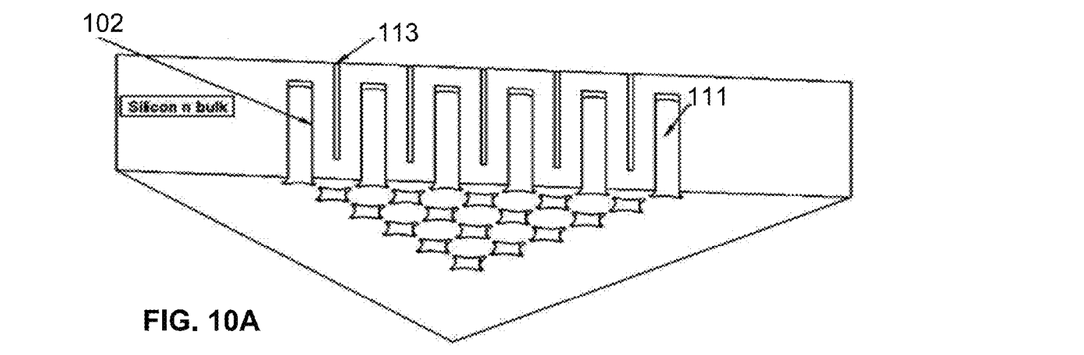
FIGS. 10A-10C, 11A-11B and 12A-12B illustrate examples of 3D structures for neutron detectors with a neutron reactive material according to a, possibly advantageous, embodiment of the invention.
Figures 10B, 10C:
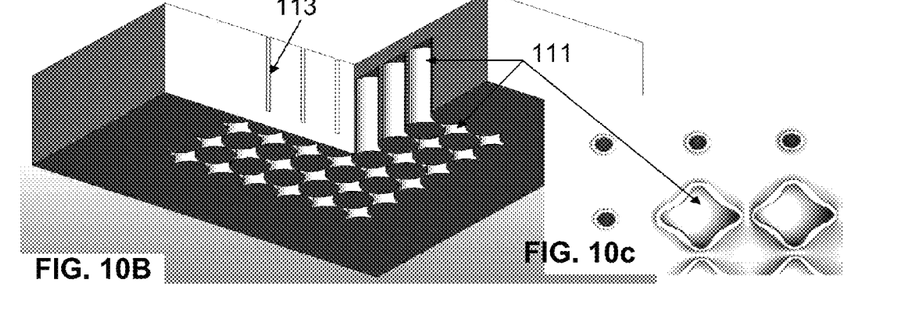
Figure 11A:
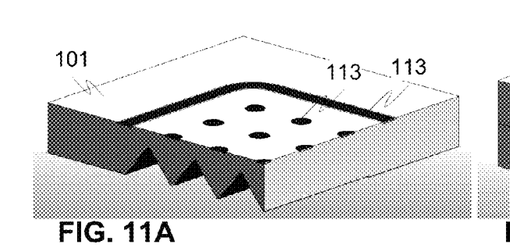
Figure 11B:
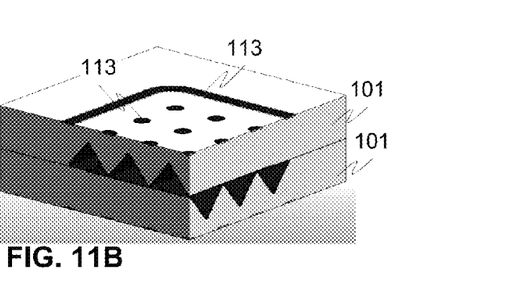
Figure 12A:
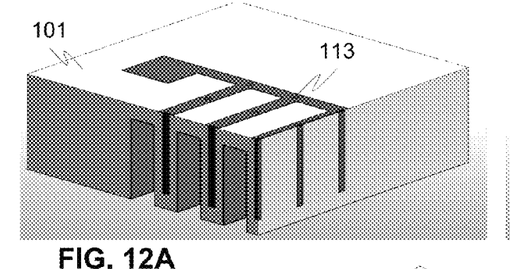
Figure 12B:
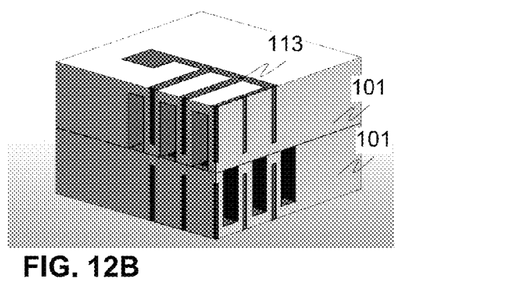

FIGS. 10-12 illustrate examples of 3D structures for neutron detector with reactive material 102. In FIGS. 10A-B the structure comprises 3D wells or trenches 111 on one side of the semiconducting element 101 and 3D electrodes 113 on the other side (according to an exemplary embodiment the wells give higher rigidity than trenches). The 3D wells and the 3D electrodes can also be made on the same side. The wells and trenches possibly advantageously comprise neutron reactive material 102. The possible benefit of the 3D structure depicted in FIGS. 10A-B is to get large effective neutron capture area and simultaneously efficient signal charge collection with low bias voltage (electric field).

One illustrative method for manufacturing the 3D structures is DRIE etching. One illustrative method to deposit the neutron reactive material in the steep vertical wall wells is for example ALD, which is successfully tested for $Gd_2O_3$ deposition. The optimization of the structure will include well and electrode geometry design to yield lowest possible gamma sensitivity (e.g., large diameter of the cylindrical 3D electrode) and highest possible neutron sensitivity (well shape etc.). It is to be noted that e.g. two detectors can be used in a back-to-back sandwich arrangement to further increase the neutron detection efficiency.

FIG. 11A illustrates a V-shaped 3D structure for the detector and FIG. 11B a sandwiched detector using the V-shaped 3D structure, and the FIGS. 12A-B a U-shaped 3D structures. These two designs presented in FIGS. 11A-B and 12A-B have both an n+ doped back side layer. The pixel electrodes 113 on the front side can either be bump bonded to a multi channel pixel readout circuit or shorted to form a single channel detector.

The neutron conversion layer may be deposited on both sides of the detectors in FIGS. 11A-B and 12A-B. The 3D trenches improve the neutron detection efficiency firstly by increasing the effective thickness the neutrons pass through. In the V-structure this thickness is higher by a factor of $1/\cos\phi$ where $\phi$ is the angle between the planar plane and the trench wall. In the U-structure the thickness is increased by placing the detector in a small angle in relation to the direction of the incoming neutrons. Then the neutrons will pass through several layers of the converter material. Secondly, the 3D trenches reduce the amount of secondary particle escape improving the ratio of detected to captured neutrons.

Figure 13A:
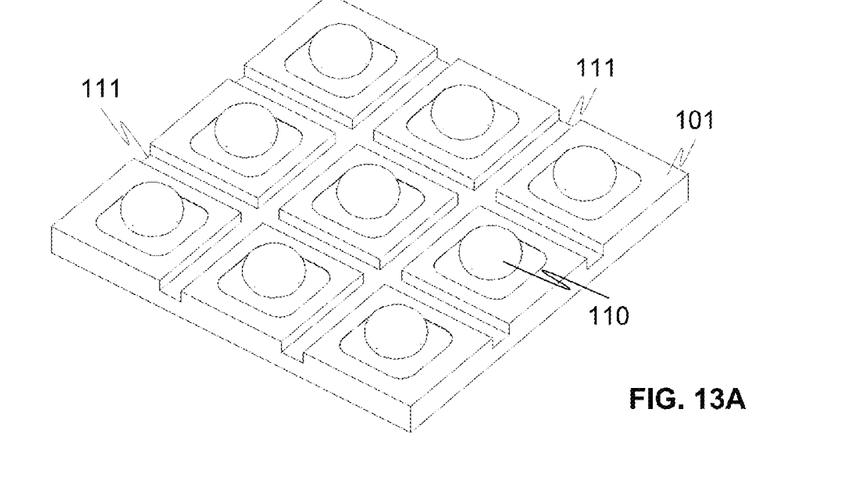
FIGS. 13A-B illustrate a semiconductor element with bump bond elements and grooves arranged on the semiconductor element surface and filled with neutron reactive material according to a, possibly advantageous, embodiment of the invention.
Figure 13B:
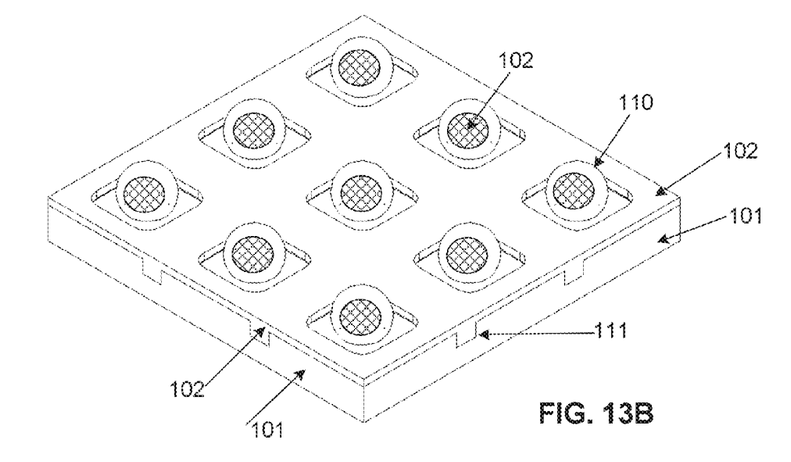

FIGS. 13A-B illustrate a semiconductor element 101 with bump bond elements 110, such as bump-balls 110, and grooves 111 arranged on the surface of the semiconductor element 101. It should be noted that according to a, possibly advantageous, embodiment of the invention the bump-balls 110 used for bump bonding the detector (or semiconducting element) 101 to the read-out electronics comprises also neutron reactive material, which still makes the neutron detection much more effective since the neutrons may also interact with the neutron reactive material inside and/or on the surface of the bump-bonding elements, such as bump-balls 110. Also the grooves 111 may be filled with neutron reactive material 102, as well as also spaces between the bump-pad areas, and/or between the read-out electronics and bump-bonding elements. The grooves 111 may be provided on the semiconducting element for example by dicing or etching.

FIGS. 14A-C illustrate illustrative neutron detectors, where the read-out electronics 107*a*, 107*b* is bump-bonded via bump-elements 110*a*, 110*b*, such as bump-balls, with the first and also second semiconducting elements 101, 108, or actually the electrodes of the semiconducting elements. The bump-balls 110*a* (especially those connecting the read-out chip 107*a* with the semiconducting element 101), possibly advantageously, comprises neutron reactive material 102 in order to still increase the efficiency of the detector to detect neutrons.

Especially it can be seen from the FIG. 14B-C that the neutrons can interact with the neutron reactive material 102 arranged both between the semiconductor element 101 and the read-out electronics 107*a*, neutron reactive material 102 arranged on the grooves 111 (thereby forming 3D or other complex structure) as well as also neutron reactive material 102 inside the bonding elements, such as bump-balls 110. In addition the neutron reactive material 102 may be arranged also on the surface (e.g. as clusters) of the read-out electronics and/or the first semiconducting element 101 and/or implanted inside the first semiconducting element 101 (not shown in FIGS. 14B-C). It should be however noted that the detector illustrated e.g. in FIGS. 14B-C, possibly advantageously, comprises own read-out chip 107*b* for reading the charges generated by the second semiconducting elements 108. The additional read-out chip 107*b* may be arranged e.g. on the top surface (facing away from the read-out chip 107*a*, as in the FIG. 14B) of the second semiconducting element 108, whereupon the distance from the neutron reactive material to the second semiconducting element is to be minimized. In addition when there is only one read-out chip 107a between the first and second semiconducting elements, inaccuracies and blurring effects due to second additional read-out chip 107b can be avoided. However, the read-out chips 107a, 107b can also be arranged face-to-face, as illustrated in FIG. 17C.

Figure 15A:
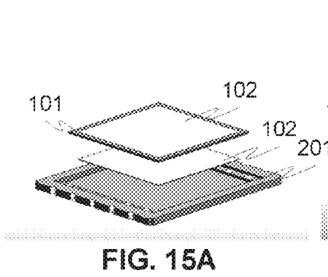
FIGS. 15A-C illustrate different types of sensors used in a modular structure according to embodiments of the invention.
Figure 15B:
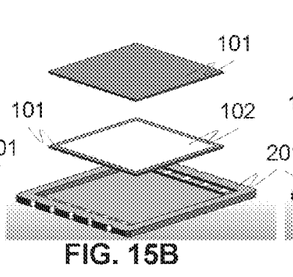
Figure 15C:
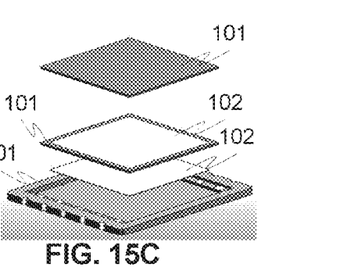

FIGS. 15A-C illustrate different detector arrangements used in a modular structure according to embodiments of the invention, where in FIG. 15A the detector comprises neutron converter of reactive material 102 around the semiconductor element 101 (both sides), such as $Gd_2O_3$ thin film above the element 101 and Gd foil in other side. In FIG. 15B the detector comprises neutron converter of reactive material 102 between the semiconductor elements 101 and the structure described in FIG. 15C is the combination of the arrangements of FIGS. 15A-B.

According to an exemplary embodiment a first layer may be for example of 1 μm $Gd_2O_3$ either at the neutron entrance window (single detectors) or in between the stacked detectors (double detectors) and a second, possibly thicker layer of $Gd_2O_3$ at the back side. The very efficient structure may be the double detector with vertical wall trenches. For example the B-10 enriched $B_4C$ converter material gives somewhat lower efficiencies than natural $Gd_2O_3$. The efficiencies can still be enhanced if the natural Gd is substituted with Gd-157 enriched $Gd_2O_3$.

A reference detector (not shown) may be otherwise identical with the neutron detectors of FIGS. 15A-15C, but it has no neutron reactive material 102. According to an exemplary embodiment the reference sensor may comprise corresponding and similar layer of same material than as the neutron reactive layer in the neutron sensitive sensor but of an isotope that does not capture or interact with neutrons.

Figure 15D:
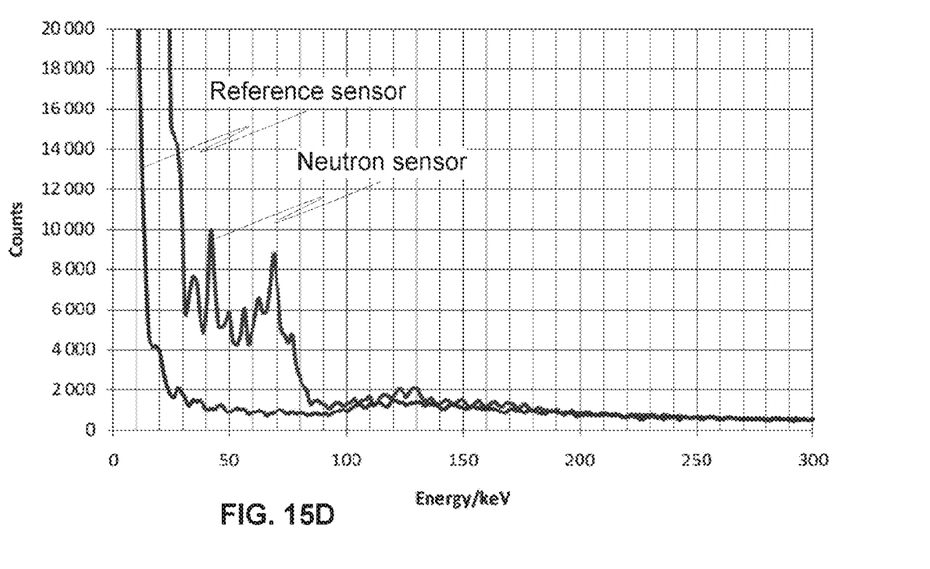
FIG. 15D illustrates an example of signal histograms detected by a reference sensor and neutron sensitive sensor according to an embodiment of the invention.

FIG. 15D illustrates an example of signal histograms detected by a reference sensor and neutron sensitive sensor according to an embodiment of the invention. According to an embodiment the counts of background gammas or other undesired photons detected by the reference sensors can be subtracted from the count of neutrons as well as the detected background gammas or other undesired photons detected by the neutron sensitive sensors, because the neutron sensitive sensor will detect essentially the same amount of background gammas or other undesired photons as the similar reference sensor.

FIGS. 16A-E illustrate different types of modular structures 300 of solid state neutron tube sensors 100 according to a, possibly advantageous, embodiment of the invention. The modular structure typically comprises 3 or more elongated members, each of which comprises at least two sensors, possibly at least one 100 for detecting neutrons and possibly at least one reference sensor 200. The sensors are possibly advantageously next to each other and/or stacked together back-to-back. The elongated members with sensors may be arranged symmetrically in a longitudinal direction to form said modular structure, as is described in FIGS. 16A-C, for example.

According to an illustrative embodiment the efficiency/area can be increased by using stacked detectors e.g. with a thin Gd layer between the detectors in addition to the thick Gd back side foil attached on the ladder PCB 301. For signal readout for example an IDEAS VA1TA multichannel charge sensitive preamp ASIC 302 can be used. Each detector of the sensor may be connected to a separate channel on the VA1TA.

Figure 16A:
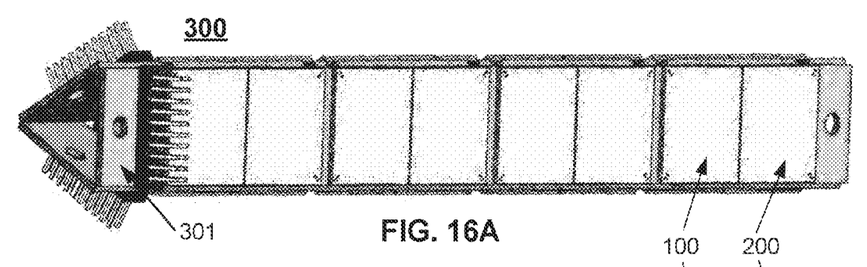
FIGS. 16A-E illustrate different types of modular structures according to a, possibly advantageous, embodiment of the invention.
Figure 16B:
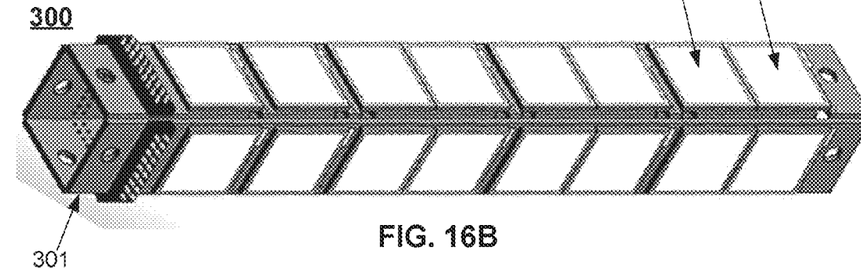
Figure 16C:
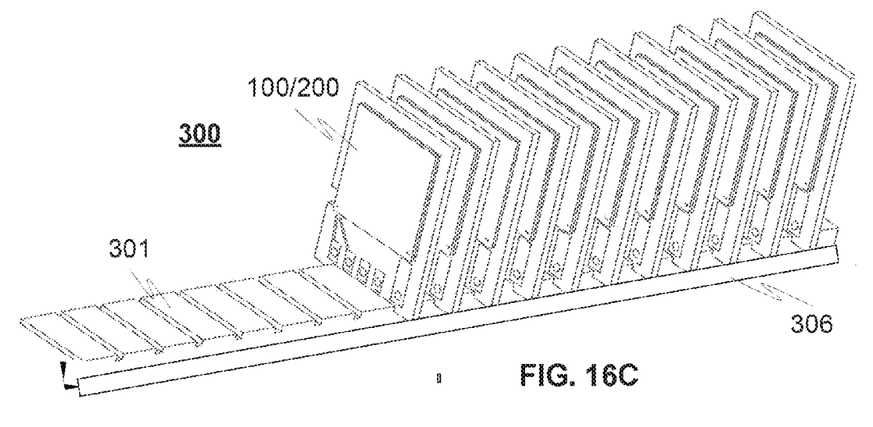
Figure 16D:
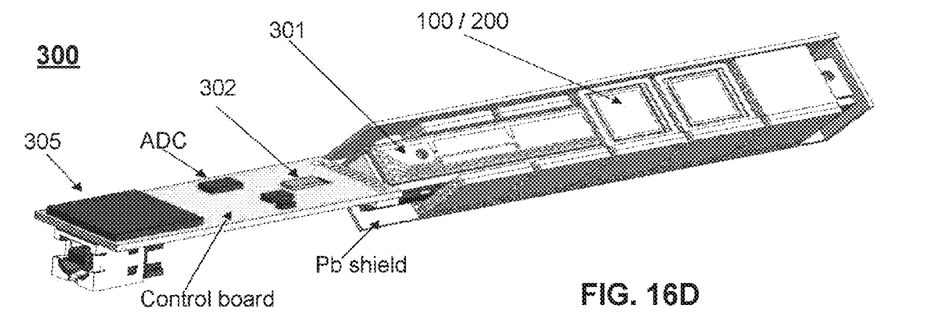
Figure 16E:
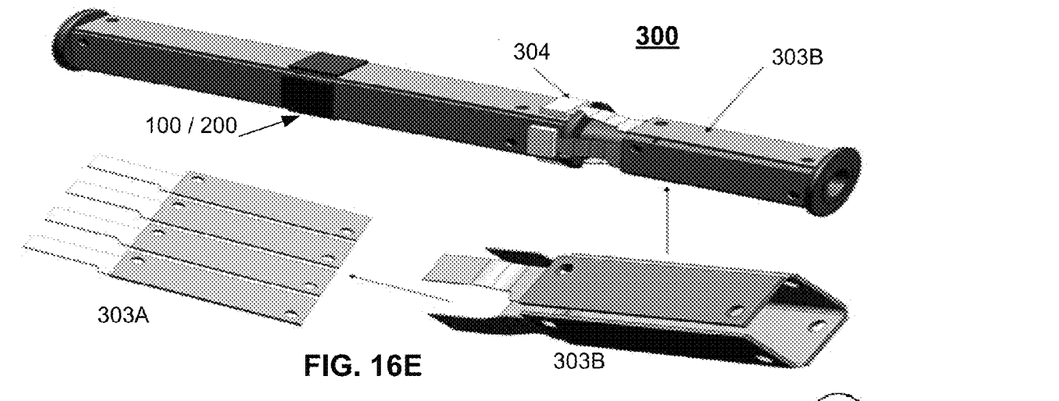

FIG. 16E shows a flexi rigid processor board 303A as a flat element, which can be folded as shown in 303B. The folded processor board can then be fitted with the module 300 for example via flexi connector 304 on the ladder board.

The sensor may be used as a single channel device by summing the signal counts of the different channels. However, the different channels can also be monitored separately to provide information on the direction of the neutron field. For example three or four detectors (one in each direction) may used as reference detectors for gamma background subtraction and the rest of the detectors will be neutron sensitive.

With an illustrative 3D detectors sandwiched the efficiency/detector area may be even 20%. The sensor configuration shown in FIG. 16A may then have a neutron detection sensitivity of about 6 cps/nv in an isotropic neutron field (cps/nv means counts per second per entering neutron flux in units of $1/cm2/s$). This is very close to a corresponding He-3 sensor, whereupon the sensors of the invention can be used for replacing the current He-3 neutron detector tubes.

Figure 17A:
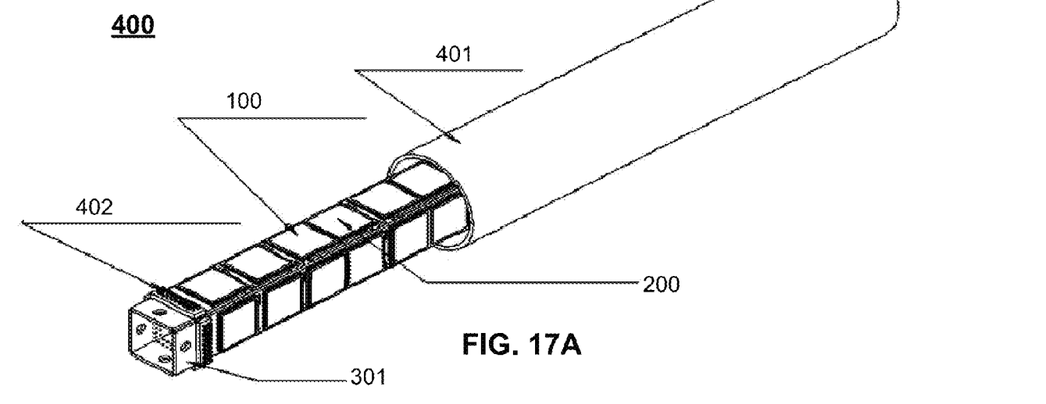
FIGS. 17A-C illustrate an exemplary envelope structure of the detector according to a, possibly advantageous, embodiment of the invention.
Figure 17B:
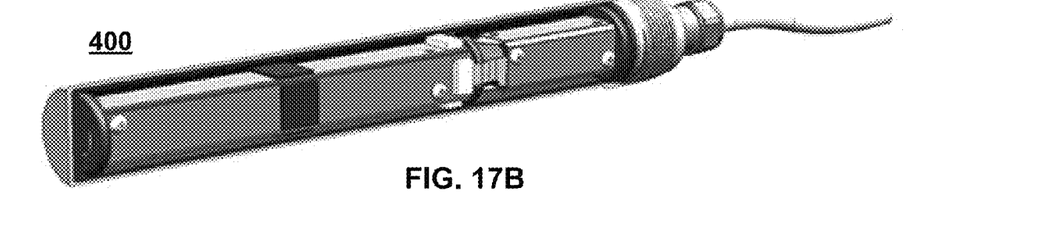
Figure 17C:
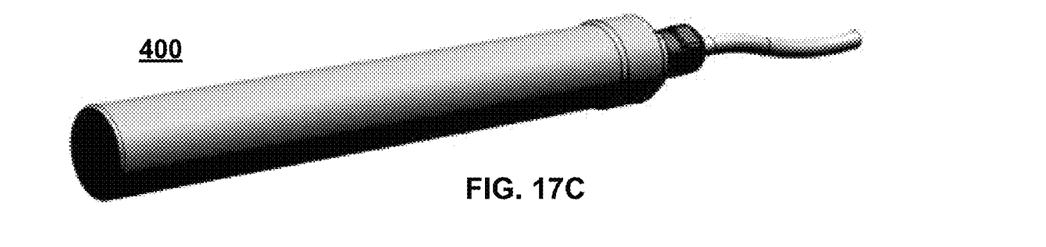

FIGS. 17A-C illustrate an illustrative envelope structure 400 of the detector according to a, possibly advantageous, embodiment of the invention, where the individual neutron detectors 100 (typical area a few $cm^2$, for example) are combined illustratively in a mosaic type configuration to form a larger area. The signal readout may be realized with a multichannel ASIC, whereupon the ladders may also comprise connectors 402 to a signal readout ASIC board.

A tube module 300 may be constructed for example of ladders 301 with several detectors per ladder, and the ladders may be arranged symmetrically for example in a cylindrical shape. It is to be noted that the ladders can naturally be arranged in any other shape as well, e.g. a panel.

Part of the detectors on the ladder can be used as reference detectors 200. If a given area is available the sensor performance can be optimized depending on the application: less reference detectors gives more space for neutron detectors raising the absolute neutron efficiency, more reference detectors improves the gamma background subtraction power in high gamma flux environments.

According to an illustrative embodiment a shielding material 401 or layers of materials, such as layered foils of metals or laminate structures with layers of nanomaterials may be used around the detector ladders to for example filter low energy gammas or X-rays, or modulating incident neutrons. For absorbing gammas and/or X-rays the shielding material comprises preferably of high-Z value material, such as Lead (Pb), Osmium (Os) or Tungsten (W). For modulating incident the shielding material comprises for example polymers, paraffin, B10, Li6F, Gd157.

According to an embodiment the tube like module with the solid state sensors as described in FIGS. 17A-C, for example, with adequate active area to generate neutron detection sensitivity comparable to the neutron sensitivity of a He-3 tube can be used as a replacement product for the current He-3 neutron detector tubes. As an example the tube like module of an embodiment of the invention may be made to fit in a 1 inch diameter 4.5 inch long tube, for example.

The coincidence means is denoted as 114 in FIGS. 14B and 14C, the cooling means as 306 in FIG. 16C, and the data processing means as 305 in FIG. 16D.

The neutron detectors in accordance with one or more embodiments of the invention have also other application areas in addition to safety and monitoring of background radiation, such as security (protection against nuclear terrorism), as well as non-destructive tests. In addition the detectors may be used for health purposes, such as personal dosimetry for e.g. personnel exposure at nuclear power plants and soldiers on a field, for example attaching the detectors to clothing or equipments carried by the user, such as a backpack One or more embodiments of the present invention offers possible advantages, such as low cost, high detection efficiency, direct real time conversion of neutron signal, compact size, low power consumption, well suitability for high volume production, good discrimination power against background X-rays and/or γ-rays, for example An embodiment of the present invention also offers flexible modular architectures, based on a variety of detector substrates and readout ASICs, for example.

As a conclusion the detection efficiency can be increased by introduction of 3D and/or more complex structures into the semiconductor detector and converter material, even if the semiconductor element and/or converting material is ultra thin. The detection efficiency can be increased from less than 5% in the case of the planar devices to more than 30% in the case of the 3D detectors The invention has been explained above with reference to the aforementioned embodiments, and several possible advantages of embodiments of the invention have been demonstrated. It is clear that the invention is not only restricted to these embodiments, but comprises all possible embodiments within the spirit and scope of the inventive thought/concept and the following patent claims. For example the presented detectors are being developed especially for neutron detecting, and counting, but can find usage also in other scientific and technical applications.

In addition, even though electrodes for collecting the charges are not described in further details, they may be arranged according to an embodiment of the invention as planar on the surface of the detector (i.e. perpendicularly to the neutron flux). However, also an embodiment where the electrodes are arranged in other way, such as essentially parallel with the neutron flux (e.g. as disclosed in the publication of WO 2009/071587), can be used for collecting the charges produced.

Furthermore it should be noted that read-out means connected to the electrodes may be implemented e.g. by an electrically conductive wire and the separate read-out electronics may be arranged elsewhere than on the surface of the detector or in direct contact with the electrodes. According to an embodiment the read-out electronics may be connected to the electrodes via wires, and/or a conductive means, such as wire or metal plate, may be used to short-circuit the electrodes of the detector, for example when only the counts are detected and the location information is not needed.

Some exemplifying embodiments of the invention are defined below with the aid of the following numbered clauses:

Clause 1. A module for a device for detecting neutrons, the module supporting one or more solid state sensors in a stacked and/or planar and/or tubular arrangement, wherein:
  at least one of the sensors comprises neutron reactive material as a neutron converter for interacting with neutrons incident thereon to be detected and to release ionizing radiation reaction products responsive to interactions with said incident neutrons, and
  each of said neutron converters is coupled with corresponding semiconductor elements so that the semiconductor elements interact with said ionizing radiation reaction products for providing electrical charges in proportion to the energy of said ionizing radiation reaction products, and said semiconductor elements being configured with electrodes for providing charge collection areas for collecting said electrical charges and to provide electrically readable signals proportional to said collected electrical charges.

Clause 2. The module according to Clause 1, wherein at least one of the sensors is:
  a reference sensor for detecting incident photons, the reference sensor either having no neutron conversion layer or having the layer made of the same material as the neutron conversion layer but of an isotope that does not capture neutrons, and/or
  a neutron sensitive and/or insensitive scintillating material sensor comprising neutron or gamma sensitive scintillator or scintillator crystal, such as KDP, ADP or CsI, in order to increase the range of incident neutron energies to be detected and discrimination power of the sensor assembly.

Clause 3. The module according to any previous Clause, wherein at least one of the solid state neutron sensor is one of the following:
  a planar sensor, where said neutron reactive material is arranged essentially in two dimensionally and essentially parallel with said semiconducting element, such as on the surface of the semiconducting element,
  a sensor having 3D structure, wherein:
    at least one side of said semiconductor element comprises complex, convoluted or rugged shape, such as sawtooth-like, and/or pores, such as pillars, channels, trenches (e.g. in the edge area of the semiconductor element), grooves, wells and/or other cavities, which are filled with the neutron reactive material,
    said semiconductor element comprises said neutron reactive material on and/or inside the structure of said first semiconductor element,
    neutron reactive material is arranged at least partially between electrodes of said semiconductor element, and/or
    neutron reactive material is disposed in a portion nearest to charge collecting areas of the semiconductor element to interact with neutrons to be detected and release ionizing radiation reaction products.

Clause 4. The module according to any previous Clause, wherein the semiconductor element is bump-bonded on read-out electronics via a plurality of bump-pad areas and bump-bonding elements, wherein the neutron reactive material is arranged between said bump-pad areas, and/or between the read-out electronics and bump-bonding elements, and wherein said bump-bonding elements advantageously comprise also said neutron reactive material.

Clause 5. The module according to any previous Clause, wherein the neutron reactive material is arranged in the sensor so that the incident neutrons to be detected penetrate at least one portion of the semiconductor element first before reaching the neutron reactive material.

Clause 6. The module according to any previous Clause, wherein the neutron reactive material is arranged between the semiconductor element and read-out electronics electrically coupled with said semiconductor element, on the same surface of said semiconductor element as the electrodes, within said electrode structures and/or on the surface of said read-out electronics.

Clause 7. The module according to any of previous Clause, wherein said semiconductor element is configured to inhibit interaction with incident photons
  by configuring said semiconductor element to be physically sufficiently thin such that it is substantially transparent to said incident photons, such as gamma and/or x-ray photons, and/or
  by arranging the charge collecting area of the semiconductor so thin that essentially only the charges generated in the charge collecting area are collected and detected and essentially not the incident photons.

Clause 8. The module according to any previous Clause, wherein the sensor comprises in addition a second semiconductor element, which is thicker than the first semiconductor element coupled with the neutron reactive material so that the second semiconductor element is sensitive for the incident photons.

Clause 9. The module according to any previous Clause, wherein at least one semiconductor element is electrically divided into plurality of areas by plurality of electrodes to form pixels so that the electrical charges generated in the corresponding semiconductor element may be collected by the nearest electrode, whereupon the location of the generated electrical charge is determined based on the location of the electrode collecting said electrical charge.

Clause 10. The module according to any previous Clause, where the module comprises at least three elongated members, each of which comprises at least two sensors disposed adjacent and/or proximal and/or essentially next to each other and/or stacked together back-to-back, and wherein the elongated members are arranged symmetrically at least in longitudinal direction to form the modular structure.

Clause 11. The module according to any previous Clause, wherein the module comprises plurality of sensors stacked together back-to-back in longitudinal direction.

Clause 12. The module according to any previous Clause, wherein the device comprises an envelope structure encapsulating the sensors, and wherein the envelope structure is in the form of a box, rectangular profile, or tube comprising shielding material or layers of materials, such as layered foils of metals or laminate structures with layers of nanomaterials, optimised for:
  absorbing gammas and/or X-rays, whereupon the shielding material comprises preferably of high-Z value material, such as Lead (Pb), Osmium (Os) or Tungsten (W), and/or
  modulating incident neutrons whereupon the shielding material comprises for example polymers, paraffin, B10, Li6F, Gd157.

Clause 13. The module according to any previous Clause, wherein the neutron reactive material comprises at least one of the following: $^{10}$B, $^{6}$Li, $^{155}$Gd, $^{157}$Gd, $^{113}$Cd, cadmium telluride (CdTe), cadmium zinc telluride (CdZnTe), natural Gadolinium oxide ($Gd_2O_3$), or composite materials based on boron nitride (BN) or lithium fluoride (LiF).

Clause 14. A module comprising at least one, more preferably at least three elongated members, each of which comprises at least two solid state sensors, the sensors being configured in the module side by side and/or stacked in a layered structure,
wherein
  at least one of the sensors comprises neutron reactive material as a neutron converter for interacting with neutrons incident thereon to be detected and to release ionizing radiation reaction products responsive to interactions with said incident neutrons,
  each of said neutron converters is coupled with corresponding semiconductor elements so that the semiconductor elements interact with said ionizing radiation reaction products for providing electrical charges in proportion to the energy of said ionizing radiation reaction products, and said semiconductor elements being configured with electrodes for providing charge collection areas for collecting said electrical charges and to provide electrically readable signals proportional to said collected electrical charges, and
  the elongated members with sensors being arranged symmetrically in a longitudinal direction to form said modular structure.

Clause 15. The module according to any previous Clause, the sensors being configured in the module side by side and/or stacked in a layered structure.

Clause 16. An arrangement for detecting neutrons, wherein the arrangement comprises one or more modules according to any previous Clause and data processing means for analysing measuring signals output by the sensors, such as rejecting signals provided by background photons in other sensors than neutron sensitive sensors from signals provided by the neutron sensitive sensors.

Clause 17. A device for detecting neutrons comprising a module according to any of Clauses 1 to 15 or an arrangement according to Clause 16.

Clause 18. The device according to Clause 17, comprising coincidence means configured to trigger the coincident detection of photons (such as gammas/X-rays) via the other sensors than the neutron sensitive sensors for optimum background rejection.

Clause 19. The, module according to any of Clauses 1 to 15 or an arrangement according to Clause 16, said one or more, modules comprises coincidence means configured to trigger the coincident detection of photons (such as gammas/X-rays) via the other sensors than the neutron sensitive sensors for optimum background rejection.

Clause 20. The device according to Clause 17 or 18, comprising cooling means for cooling the sensors, such as a cold finger arrangement, a heat conductive strip of metal connected to an outside heat sink, or an active cooling element, such as Peltier element or a small mechanical fan.

Clause 21. A module according to any of Clauses 1 to 15 or an arrangement according to Clause 16, said one or more modules comprising cooling means for cooling the sensors, such as a cold finger arrangement, a heat conductive strip of metal connected to an outside heat sink, or an active cooling element, such as Peltier element or a small mechanical fan.

Clause 22. A sensor to be used in any module according to any of Clauses 1-15, 19 or 21 or in a device according to any of Clauses 17, 18 or 20, wherein the sensor is a solid state neutron sensor and is one of the following:
  a planar sensor, where said neutron reactive material is arranged essentially in two dimensionally and essentially parallel with said semiconducting element
  a sensor having 3D structure, wherein:
    at least one side of said semiconductor element comprises complex, convoluted or rugged shape, such as sawtooth-like, and/or pores, such as pillars, channels, grooves, wells and/or other cavities, which are filled with the neutron reactive material,
    said semiconductor element comprises said neutron reactive material on and/or inside the structure of said semiconductor element,
    neutron reactive material is arranged at least partially between electrodes of said semiconductor element, and/or
    neutron reactive material is disposed in a portion nearest to charge collecting areas of the semiconductor element to interact with neutrons to be detected and release ionizing radiation reaction products.

Clause 23. A module according to any of Clauses 15, 19 or 21 or a device according to any of Clauses 17, 18 or 20 comprising a sensor according to Clause 22.

As used herein, the terms "comprises", "comprising", "includes", "has", "having" or any other variation thereof, are intended to cover a non-exclusive inclusion. For example, a process, a method, article or apparatus. Further, unless explicitly stated to the contrary, "or" refers to an inclusive or and not to an exclusive or. For example, a condition A or B is satisfied by any one of the following; A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. The description should be read to include one or at least one and the singular also includes the plural unless it is obvious that it is meant otherwise.

The invention claimed is:

1. A module for a device for detecting neutrons, the module supporting solid state sensors in a stacked and/or planar and/or tubular arrangement, wherein:
   at least one of the sensors comprises neutron reactive material as a neutron converter for interacting with neutrons incident thereon to be detected and to release ionizing radiation reaction products responsive to interactions with said incident neutrons, and
   each of said neutron converters is coupled with corresponding semiconductor elements so that the semiconductor elements interact with said ionizing radiation reaction products for providing electrical charges in proportion to the energy of said ionizing radiation reaction products, and each of said semiconductor elements being configured with a plurality of electrodes for providing a plurality of charge collection areas for collecting said electrical charges and to provide electrically readable signals proportional to said collected electrical charges, wherein
   the plurality of charge collection areas is configured to form a pixeled area and to provide also location information of the interactions.

2. The module according to claim 1, wherein at least one of the sensors is:
   a reference sensor for detecting incident photons, the reference sensor either having no neutron conversion layer or having the layer made of the same material as the neutron conversion layer but of an isotope that does not capture neutrons, and/or
   a neutron sensitive and/or insensitive scintillating material sensor comprising neutron or gamma sensitive scintillator or scintillator crystal in order to increase the range of incident neutron energies to be detected and discrimination power of the sensor assembly.

3. The module according to claim 1, wherein at least one of the solid state neutron sensors is one of the following:
   a planar sensor, where said neutron reactive material is arranged essentially in two dimensionally and essentially parallel with said semiconductor element,
   a sensor having 3D structure, wherein:
   at least one side of said semiconductor element comprises cavities filled with the neutron reactive material,
   said semiconductor element comprises said neutron reactive material on and/or inside a structure of a first semiconductor element,
   neutron reactive material is arranged at least partially between electrodes of said semiconductor element, and/or
   neutron reactive material is disposed in a portion nearest to charge collecting areas of the semiconductor element to interact with neutrons to be detected and release ionizing radiation reaction products.

4. The module according to claim 1, wherein the semiconductor element is bump-bonded on read-out electronics via a plurality of bump-pad areas and bump-bonding elements, wherein the neutron reactive material is arranged between said bump-pad areas, and/or between the read-out electronics and bump-bonding elements, and wherein said bump-bonding elements advantageously comprise also said neutron reactive material.

5. The module according to claim 1, wherein the neutron reactive material is arranged in the sensor so that the incident neutrons to be detected penetrate at least one portion of the semiconductor element first before reaching the neutron reactive material.

6. The module according to claim 1, wherein the neutron reactive material is arranged between the semiconductor element and read-out electronics electrically coupled with said semiconductor element, on the same surface of said semiconductor element as the electrodes, within said electrode structures and/or on the surface of said read-out electronics.

7. The module according to claim 1, wherein said semiconductor element is configured to inhibit interaction with incident photons
   by configuring said semiconductor element to be physically sufficiently thin to be substantially transparent to said incident photons, comprising gamma and/or x-ray photons, and/or
   by arranging the charge collecting area of the semiconductor so thin that essentially only the charges generated in the charge collecting area are collected and detected and essentially not the incident photons.

8. The module according to claim 1, wherein the sensor comprises in addition a second semiconductor element, which is thicker than the first semiconductor element coupled with the neutron reactive material so that the second semiconductor element is sensitive for the incident photons.

9. The module according to claim 1, wherein at least one semiconductor element is electrically divided into a plurality of areas by the plurality of electrodes to form a plurality of pixels so that the electrical charges generated in the corresponding semiconductor element may be collected by the nearest electrode, whereupon the location of the generated electrical charge is determined based on the location of the electrode collecting said electrical charge.

10. The module according to claim 1, where the module comprises at least three elongated members, each of which comprises at least two sensors disposed adjacent and/or proximal and/or essentially next to each other and/or stacked together back-to-back, and wherein the elongated members are arranged symmetrically at least in longitudinal direction to form the modular structure.

11. The module according to claim 1, wherein the module comprises plurality of sensors stacked together back-to-back in longitudinal direction.

12. The module according to claim 1, wherein the device comprises an envelope structure encapsulating the sensors, and wherein the envelope structure is in the form of a box, rectangular profile, or tube comprising shielding material or layers of materials optimised for:
   absorbing gammas and/or X-rays, whereupon the shielding material comprises a high-Z value material, comprising Lead (Pb), Osmium (Os) or Tungsten (W), and/or
   modulating incident neutrons whereupon the shielding material comprises polymers, paraffin, B10, Li6F, or Gd157.

13. The module according to claim 1, wherein the neutron reactive material comprises at least one of the following: $^{10}$B, $^{6}$Li, $^{155}$Gd, $^{157}$Gd, $^{113}$Cd, cadmium telluride (CdTe), cadmium zinc telluride (CdZnTe), natural Gadolinium oxide ($Gd_2O_3$), or composite materials based on boron nitride (BN) or lithium fluoride (LiF).

14. A module comprising elongated members, each of which comprises at least two solid state sensors, the sensors being configured in the module side by side and/or stacked in a layered structure, wherein
   at least one of the sensors comprises neutron reactive material as a neutron converter for interacting with neutrons incident thereon to be detected and to release ionizing radiation reaction products responsive to interactions with said incident neutrons,
   each of said neutron converters is coupled with corresponding semiconductor elements so that the semiconductor elements interact with said ionizing radiation reaction products for providing electrical charges in proportion to the energy of said ionizing radiation reaction products, and said semiconductor elements each being configured with a plurality electrodes adapted for providing a plurality of charge collection areas for collecting said electrical charges and to provide electrically readable signals proportional to said collected electrical charges, the plurality of charge collection areas being configured to formed a pixeled area and to also provide location information of interactions, and
   the elongated members with sensors being arranged symmetrically in a longitudinal direction.

15. The module according to claim 1, wherein the sensors are configured in the module side by side and/or stacked in a layered structure.

16. The module according to claim 1, wherein the module comprises coincidence detection device configured to trigger the coincident detection of photons via sensors other than the neutron sensitive sensors for optimum background rejection.

17. The module according to claim 1, wherein the module comprises cooling means for cooling the sensors.

18. The module according to claim 1, wherein the module further comprises a data processor configured for analysing measuring signals output by the sensors.

19. A sensor comprising:
   neutron reactive material as a neutron converter for interacting with neutrons incident thereon to be detected and to release ionizing radiation reaction products responsive to interactions with said incident neutrons, and
   a semiconductor element coupled with the neutron converter so that the semiconductor elements interact with said ionizing radiation reaction products for providing electrical charges in proportion to the energy of said ionizing radiation reaction products, and each of said semiconductor elements being configured with a plurality of electrodes for providing a plurality of charge collection areas for collecting said electrical charges and to provide electrically readable signals proportional to said collected electrical charges, the plurality of charge collection areas being configured to formed a pixeled area and to also provide location information of interactions,
wherein the sensor is one of the following:
   a planar sensor, where said neutron reactive material is arranged essentially in two dimensionally and essentially parallel with said semiconducting element,
   a sensor having 3D structure, wherein:
   at least one side of said semiconductor element comprises cavities filled with the neutron reactive material,
   said semiconductor element comprises said neutron reactive material on and/or inside the structure of said semiconductor element,
   neutron reactive material is arranged at least partially between electrodes of said semiconductor element, and/or
   neutron reactive material is disposed in a portion nearest to charge collecting areas of the semiconductor element to interact with neutrons to be detected and release ionizing radiation reaction products.

20. The module according to claim 1, wherein
   the module comprises 3 or more elongated members, each elongated member having a sensor for detecting neutrons and a reference detector,
   the neutron reactive material is $Gd_2O_3$,
   each sensor is a semiconductor-on silicon wafer,
   at least one of the sensors includes a semiconductor layer having a thickness in a range of 10-30 μm, and
   the neutron active material is deposited in pores or V-shaped grooves having an aspect ratio of 20:1 or greater.

* * * * *